Dec. 25, 1962     C. N. LENGYEL     3,069,923
LINK MEMBER
Filed Nov. 17, 1960     2 Sheets-Sheet 1
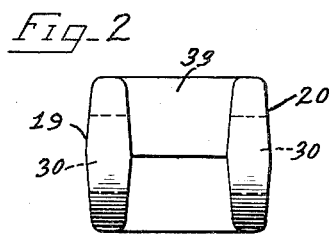
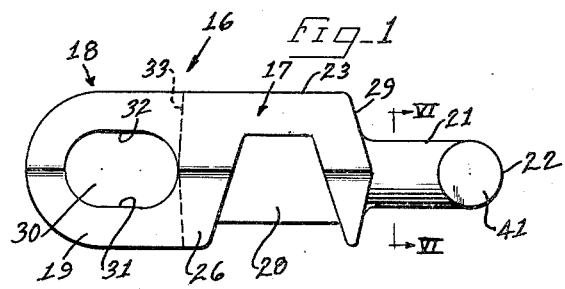
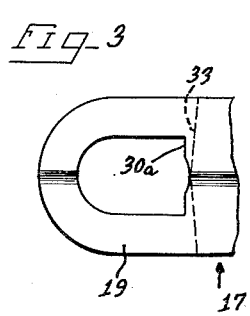
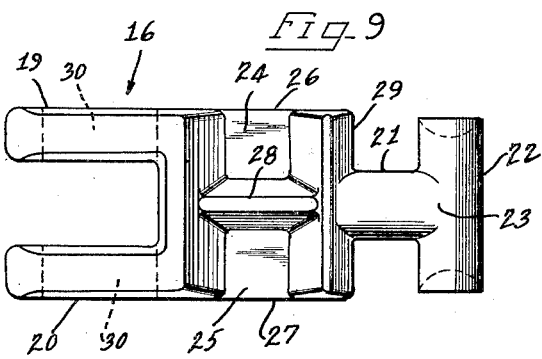
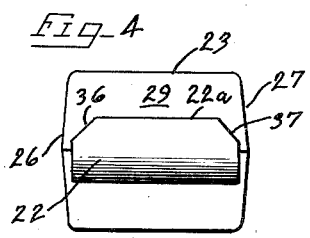
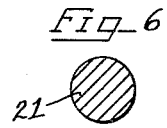
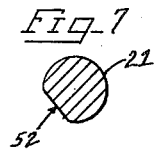
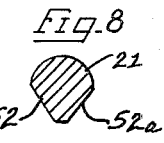
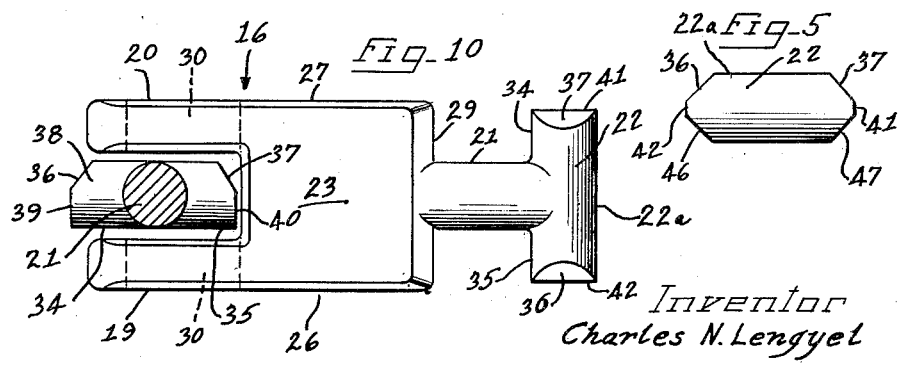
Inventor
Charles N. Lengyel Dec. 25, 1962 C. N. LENGYEL 3,069,923
LINK MEMBER
Filed Nov. 17, 1960 2 Sheets-Sheet 2
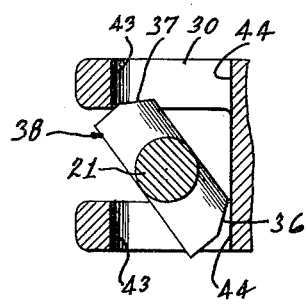
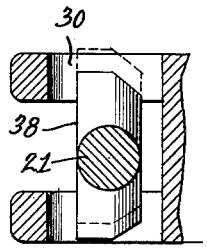
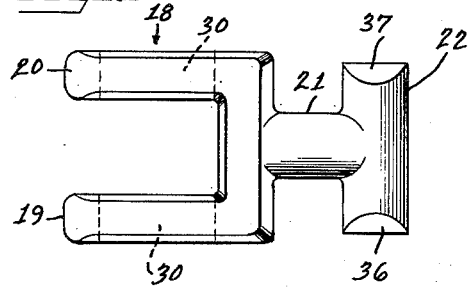
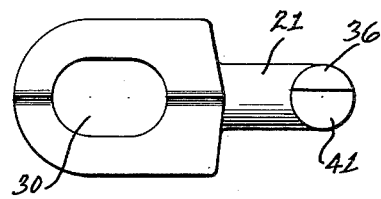
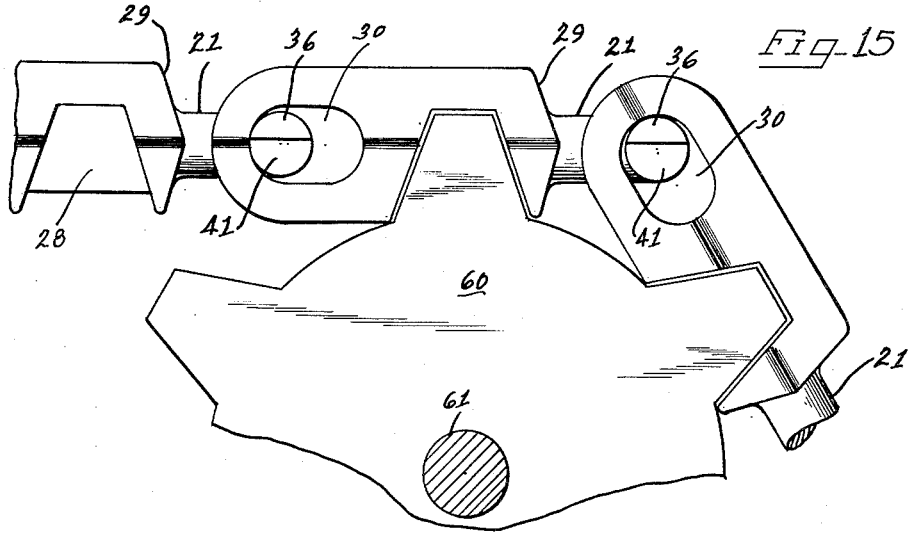
Inventor
Charles N. Lengyel
by Hill, Sherman, Meroni, Gross & Simpson
Attys.

United States Patent Office 3,069,923
Patented Dec. 25, 1962

3,069,923
LINK MEMBER
Charles N. Lengyel, Chicago, Ill., assignor to Kropp Forge Co., Chicago, Ill., a corporation of Illinois
Filed Nov. 17, 1960, Ser. No. 69,931
3 Claims. (Cl. 74—254)

This invention relates to chain links having a slotted clevis end and an opposite integral pin end with the pin end adapted to be rocked into the clevis end of an adjacent link to form a pivot, or hinge connection which cannot disengage in operation. The slots of the adjacent link clevis end hold the pin against rocking rotation except when the links are in 90° relation. Then when in the 90° relation the pin must be rotated into the slots with one end inboard and the other end outboard.

This position and these conditions are never met under operating conditions when such links are assembled in an endless chain.

Thus the user of the link members may readily assemble them in any desired length.

Briefly stated, the present invention involves the features of enlarging the slots in the clevis extensions of each link so that the T-shaped male portion of an adjacent link may be rotated into the elongated slots in the clevis portion of the adjacent link when the links are appropriately positioned relative to one another. Thus any number of links may be assembled in chains of any desired length.

It is therefore an object of the present invention to provide new and improved driven means.

It is another object of the present invention to eliminate the requirement for separate pins to connect adjacent links in chain lengths.

Another object of the present invention is to provide links requiring a minimum of machining and drilling.

It is another object of the present invention to provide link members which are easily assembled in chain lengths.

It is a further object of the present invention to provide chain link members which may be readily assembled and disassembled in various lengths.

Still another object of the present invention is to provide one-piece forged metal link members having a slotted open-ended clevis and an opposite T-shaped pin end of a dimension to be rocked into the clevis slots of an adjacent link from a position never met under operating conditions when the links are assembled in chain lengths.

These and other objects, features and advantages of the present invention will become more apparent upon a careful consideration of the following detailed description, when considered in conjunction with the accompanying drawing, wherein the same reference character or numeral refers to like or corresponding parts throughout the several views.

On the drawing.

FIGURE 1 is a view in side elevation illustrating a preferred embodiment of a link member constructed in accordance with the principles of the present invention.

FIGURE 2 is an end view in elevation illustrating the clevis extension features.

FIGURE 3 is a fragmentary view in side elevation illustrating a modified form of clevis slot.

FIGURE 4 is a view in front elevation of the link member of FIGURE 1, with a beveled integral pin.

FIGURE 5 is a view in front elevation illustrating a modified form of beveled integral pin.

FIGURE 6 is a view taken along lines VI—VI of FIGURE 1.

FIGURE 7 is a view in cross section illustrating a modification of the tongue portion of FIGURE 6.

FIGURE 8 is a view in cross section illustrating another modification of the tongue portion of FIGURE 6.

FIGURE 9 is a bottom view of the link member of FIGURE 1.

FIGURE 10 is a top view showing an adjacent link in fragmentary section positioned for connection in articulate relation.

FIGURE 11 is a fragmentary view in partial section illustrating the manner in which an integral pin of one link is inserted in the clevis slots of an adjacent link.

FIGURE 12 is a fragmentary view in partial section showing the integral pin portion of a link member in the clevis slots of an adjacent link member.

FIGURE 13 is to top view illustrating another embodiment of my invention.

FIGURE 14 is a view in side elevation of the link member of FIGURE 13.

FIGURE 15 is a fragmentary view in side elevation illustrating link members of FIGURE 1 in articulate relation traversing a driving sprocket.

Referring to FIGURE 1, a link 16, constructed in accordance with the principles of my invention as a one piece metal forging, comprises three major integral portions, a body portion 17, a clevis portion 18 having a pair of bored finger extensions 19 and 20 and a tongue portion 21 provided with an integral pin 22.

The body portion 17 is provided with a flat upper surface 23, and, in the preferred arrangement shown in FIGURE 9, is provided with a pair of bottom recesses 24 and 25 adapted to receive the teeth of the driving means employed therewith. The respective side walls 26 and 27 of the body portion 17 are open to facilitate adjustment of the link members in assembled relation with the driving means sprocket teeth and further to lighten the weight of each link. A generally centrally located divider wall 28 formed integrally with the body portion 17 assures positive seating of the link on the driving means sprocket teeth and assist in preventing undesirable movement of the link member during operation.

The inclined side wall 29 of the link body portion from which the tongue 21 extends converges to a line located approximately on the longitudinal axis of the link member as shown in FIGURE 1. The angular inclination of the taper of the upper portion of the side wall 29 is of greater magnitude than the taper of the lower portion thereof for purposes hereinafter described.

The clevis portion 18 is formed integral with the body portion and finger extensions 19 and 20 thereof are each provided with a slot 30 adapted to receive the integral pin of the adjacent link and to permit lateral translation and limited relative displacement of the pin of the adjacent link, when assembled. The slot 30 may be of any shape which is adapted to permit insertion of the integral pin of an adjacent link, as for example, the slot may be ellipsoidal as shown in FIGURE 1 or may have one of its rounded ends and interrupted as shown in FIGURE 3 and designated by the numeral 30a. A sufficient tolerance exists between the surfaces 31 and 32 of the slot to prevent binding of the pin of an adjacent link when inserted therein. Depending upon the length of the link member to be inserted in the slots 30, the slots are elongated longitudinally to provide sufficient tolerance for insertion of the integral pin of the adjacent link which is initially introduced angularly as shown in FIGURE 11.

As shown in FIGURE 2, the finger extensions 19 and 20 of the clevis portion define therebetween a side wall 33 opposite side wall 29.

Centrally located in the side wall 29 of the body portion is the integral pin portion 22 preferably of cylindrical configuration. The generally cylindrically shaped connecting pin 22 is integrally mounted with the tongue portion 21. Preferably, the diameters of the tongue portion 21 and of the pin extensions 34 and 35 are substantially the same to minimize stress failure which could possibly occur if the tongue portion were of lesser diameter than the connecting pin extensions 34 and 35.

As clearly appears in FIGURE 1, each of the connecting pin extensions 34 and 35 may be of any configuration, flat, round, concave, convex, etc. or optionally, as appears in FIGURE 4, may be partially tapered as indicated at 36 and 37 to permit insertion thereof into the clevis slots 30 of an adjacent link. The pin 22 having preferably flat end surfaces as appears in FIGURE 1, need only be positioned between the clevis extension of an adjacent link in proximity to the clevis slots and at an angle of 90° and rotatably rocked into the slots in either direction.

When the pin has beveled surfaces 36 and 37 they are formed adjacent the upper surface of the connecting pin to facilitate assembly by right handed personnel as appears in FIGURES 4 through 10.

For right handed connection, a top view of link 16 is shown with the partially beveled end surfaces 36 and 37 convergingly tapering inwardly and upwardly toward the top surface of the link. The adjacent link 38 shown in fragmentary section for clarity of illustration, has its connecting pin 22 positioned between the finger extensions 19 and 20 of link 16 so that its flat end surfaces 39 and 40 are substantially perpendicular to the flat end surfaces 41 and 42 of link member 16. The top surface 23 and beveled surfaces 36 and 37 of the tongue of member 38 are positioned adjacent link member 20, at a 90° angle. Thus by rotating link member 38 in a clockwise direction, the extensions 34 and 35 of the integral connecting pin may be inserted in the slots 30 of link member 16 as shown in FIGURE 11. The beveled surfaces 36 and 37 of link member 38 provide the necessary tolerance to permit clearance between the inner surfaces 43 and 44 of each slot as the connecting pin of link member 38 is being rotated. Once the link is inserted in the slots 30 of the link 16 as appears in FIGURE 12, the tongue of link member 38 is free for limited lateral movement in the slot as shown by the dotted lines, depending, of course, upon the diameter of the tongue portion 21 thereof.

An alternate embodiment illustrating a tongue portion, provided with not only partially beveled surfaces 36 and 37 convergingly tapering to the top surface of the integral connecting pin 22, but also a pair of partially beveled surfaces 46 and 47 convergingly tapering from the flat end surfaces 42 to the opposed surface of the integral pin 22 is shown in FIGURE 5. By similarly positioning a link member 38 having connecting pin surfaces beveled as shown in FIGURE 5 with the top surface 22a of the link member adjacent the clevis extension 20 of the adjacent link member 16, as appears in FIGURE 10, the links may be assembled by rotation of link member 38 in either a clockwise or counterclockwise direction.

Thus the connecting pin may be rotated in either a clockwise or counterclockwise direction for insertion of the end portions thereof in the clevis slots 30 of the extensions 19 and 20 of the adjacent link. It will be appreciated that the integral tongue 22 may be provided only with the tapering surfaces 46 and 47, if desired, in which case the link member 38 may be inserted in the clevis slots 30 by counterclockwise rotation of the integral pin 45.

The tongue portion 21 may be cylindrical in section as shown in FIGURE 6. To facilitate assemblage of the link members, the tongue portion 21 may be provided with a tapered surface 52, as appears in FIGURE 7, preferably the full length of the tongue portion. The beveled surface 52 inwardly inclines toward the bottom of the link and is provided on the side of the tongue portion 21 opposite the beveled surface 37 of the integral pin 22 substantially parallel therewith in the same plane.

Thus for clockwise rotation of a link 38 as appears in FIGURE 10, the bevel 52 will be provided on the side shown in FIGURE 7. Conversely, for counterclockwise rotation where the beveled surfaces taper inwardly toward the bottom of the link, the beveled surface 52a of the tongue portion 21 would be provided on the right side of the link as appears in FIGURE 8. Where the connecting pin 22 is beveled as in FIGURE 5 for either clockwise or counterclockwise rotation thereof, both sides of the tongue portion 21 may be beveled as shown in FIGURE 8.

An alternate embodiment of link member constructed in accordance with my invention appears in FIGURES 13 and 14. The link member, as shown, comprises a clevis portion, generally designated by the numeral 18 having a pair of bifurcated finger extensions 19 and 20, each of which is provided with a bore 30 similar to the bore shown in FIGURE 1. In this embodiment the tongue portion 21 is integral with the clevis portion 18 and mounts at the opposite end thereof the integral connecting pin 22 provided with the partially tapered end surfaces 36 and 37. Thus for special applications wherein frictional drive means are provided, a body portion, such as appears in FIGURE 1, having recesses therein adapted for engagement with teeth of a driving sprocket may be eliminated. The links are assembled in articulate relation in substantially the same manner as above described in connection with the link members of FIGURE 1.

FIGURE 15 illustrates a plurality of link members of FIGURE 1 connected in an endless chain length traversing the sprocket wheel 60 of the chain driving means. Sprocket 60 is operatively responsive to driving shaft 61 connected to driving means of conventional construction (not shown).

The material of construction of the link members may be of any suitable material, such as steel, iron, plastics and other materials capable of being molded, shaped or formed in the manner hereinabove described and having the requisite strength for any desired application.

It will be appreciated from the foregoing that by employment of link members and link assemblages having the features of my invention, means, simple and compact in construction and efficient and high speed in operation, are provided which may be quickly assembled and disassembled in chains of any desired length by the user without the necessity for a connecting link of different configuration and, in addition, I minimize the possibility of production line shut-down caused by failure of link members in an endless chain length.

Furthermore, the pins of the link members may be dimensioned so as to permit assemblage of the links only when the links are in a relative position never met under operating conditions when the links are assembled in chain lengths, particularly those link members having pins with beveled end surfaces.

Although various minor modifications might be suggested to those versed in the art, it should be understood that I wish to embody within the scope of the patent warranted hereon, all such embodiments as reasonably and properly come within the scope of my contribution to the art.

I claim as my invention:

1. A link member adapted for coupling with an identical member without distortion of either member which comprises a one-piece body having a pair of bottom recesses separated by an axially extending divider wall and adapted to receive the teeth of a sprocket, said body having an integral clevis portion extending from one end thereof and an integral tongue portion extending from the opposite end thereof, said clevis portion including a pair of spaced opposed parallel fingers with axially elongated slots therethrough, said tongue portion including a central axially extending section with a transverse pin on the end thereof, said pin being longer than the space between the fingers to project into the finger slots, said space between the fingers adapted to receive the pin freely therebetween when the pin is axially aligned with the fingers, and said pin having beveled end portions adapted to clear the body portion and the outboard end of the clevis portion when the pin is rotated from an axial position between the finger portions to a transverse position extending into the slots of the finger portions, whereby identical link members can be rocked into position to form an articulate joint with the link sections successively engaging the teeth of a sprocket gear without distortion of the link sections and without possibility of separation.

2. A chain link comprising a one-piece metal forging having a main body portion with a bottom recess adapted to receive sprocket teeth, an integral clevis portion extending from one end of the body portion having spaced parallel centrally slotted fingers flush with the sides of the body portion and extending from the top to the bottom of the body portion, an integral tongue portion extending axially from the opposite end of the body portion having a central axially extending member with a transverse integral pin on the end thereof, said pin lying in a plane intermediate the top and bottom of the body and parallel therewith, said pin having a length greater than the space between the fingers and a peripheral dimension adapted to fit freely in said space when positioned in axial relation with the body, the ends of said pin being tapered to respectively ride over the outboard end of one finger and the inboard end of the opposite finger when the pin is rotated from the axial position between the fingers to a transverse position for extending into the apertures of the fingers, whereby two identical link members can be connected in articulate relation with open bottom sprocket teeth receiving portions aligned to successively receive sprocket teeth and with the respective clevis and tongue portions freely articulately joined without possibility of separation when aligned to successively receive the sprocket teeth and without requiring distortion of a member for joining successive links in articulate relation.

3. A chain link member which comprises an integral one-piece metal forging having a central body portion with end walls, a top wall, side walls and a transverse recessed bottom with the recess in the bottom opening through the side walls and having a central longitudinally extending divider wall, a tongue portion projecting axially from one of said end walls in alignment with said divider wall and lying in a plane intermediate the top and bottom walls, a transverse generally cylindrical pin portion on the outer end of said tongue portion projecting laterally beyond both sides of the tongue portion and terminating substantially flush with the side walls, a clevis portion projecting from the other of said end walls having a pair of spaced opposed fingers each with an aperture therethrough and adapted to receive therebetween a pin portion of an identical chain link member with the pin portion disposed parallel with the fingers, said pin portion having oppositely beveled ends adapted to clear the outboard end of one finger and the inboard end of the opposite finger when the pin is rotated from a position between the fingers to a position transverse to the fingers, and said tongue portion having a peripheral dimension smaller than the space between the fingers to accommodate rotation of the pin for connecting successive link members without distorting the fingers, whereby successive link members will have open bottoms for receiving sprocket teeth to be held in alignment preventing relative rotation of adjacent link members to a disengaging position.

References Cited in the file of this patent

UNITED STATES PATENTS

| | | |
|---|---|---|
| 180,907 | Morgan | Aug. 8, 1876 |
| 377,120 | Schofield | Jan. 31, 1888 |
| 1,584,793 | Morehead et al. | May 18, 1926 |
| 1,804,701 | Mojonnier | May 12, 1931 |
| 2,758,483 | David | Aug. 14, 1956 |
| 2,793,536 | Onulak | May 28, 1957 |
| 2,938,329 | Onulak | May 31, 1960 |